(12) United States Patent
Wadding et al.

(10) Patent No.: US 7,366,580 B2
(45) Date of Patent: Apr. 29, 2008

(54) PRODUCTION LINE CONTROL USING SHIFT REGISTERS FOR CONTACT LENS MANUFACTURE

(75) Inventors: John Wadding, Earlscourt (IE); Robert Duggan, Piltown (IE); Trevor O'Neill, Tramore (IE); David Sheppard, Tramore (IE); Gabriel Kennedy, Tramore (IE); Michael W. Murphy, Woodstown Upper (IE)

(73) Assignee: Bausch & Lomb Incorporated, Rochester, NY (US)

( * ) Notice: Subject to any disclaimer, the term of this patent is extended or adjusted under 35 U.S.C. 154(b) by 152 days.

(21) Appl. No.: 10/583,494

(22) PCT Filed: Dec. 17, 2004

(86) PCT No.: PCT/EP2004/014487

§ 371 (c)(1),
(2), (4) Date: Jun. 16, 2006

(87) PCT Pub. No.: WO2005/063471

PCT Pub. Date: Jul. 14, 2005

(65) Prior Publication Data

US 2007/0162173 A1    Jul. 12, 2007

(30) Foreign Application Priority Data

Dec. 22, 2003    (GB)    ................ 0329718.1

(51) Int. Cl.
*G06F 19/00*    (2006.01)
(52) U.S. Cl. ..................................... 700/116
(58) Field of Classification Search ........ 700/108–110, 700/115–117, 197; 377/54, 64, 67, 78; 365/78; 711/109
See application file for complete search history.

(56) References Cited

U.S. PATENT DOCUMENTS

| | | | | |
|---|---|---|---|---|
| 5,555,504 A | * | 9/1996 | Lepper et al. | 700/115 |
| 5,699,242 A | * | 12/1997 | Togawa et al. | 700/5 |
| 5,844,802 A | * | 12/1998 | Lepper et al. | 700/115 |
| 6,381,512 B1 | * | 4/2002 | Saitou et al. | 700/200 |
| 6,522,939 B1 | * | 2/2003 | Strauch et al. | 700/116 |
| 6,609,041 B1 | * | 8/2003 | Sanka et al. | 700/115 |
| 6,622,102 B2 | * | 9/2003 | Skidmore | 702/84 |
| 6,836,692 B2 | * | 12/2004 | Leavitt et al. | 700/112 |
| 6,968,292 B2 | * | 11/2005 | Boyer | 702/182 |
| 2002/0198618 A1 | * | 12/2002 | Madden et al. | 700/101 |
| 2004/0139296 A1 | * | 7/2004 | Litaize et al. | 712/11 |

FOREIGN PATENT DOCUMENTS

EP          1052084 A2   *  11/2000

* cited by examiner

*Primary Examiner*—M. N. Von Buhr
(74) *Attorney, Agent, or Firm*—Glenn D. Smith; John E. Thomas

(57) ABSTRACT

A method for controlling a production line for the manufacture and/or packaging of contact lenses which production line simultaneous by processes at least two lots, the method comprising dividing at least a portion of the production line into a series of cells through which the contact lens pass sequentially, and providing a control system comprising at least three shifts registers each containing information about each of said cells, including: (a) a location shift register which indicates whether a cell should be empty or occupied, (b) a lot data shift register which is a non-binary shift register and contains manufacturing and/or prescription data about the contact lens which should be in the cell and (c) a condition shift register which provides an indication of the condition of the product in the cell, and simultaneously indexing all of said shift registers as a lens passes down the production line from one cell to the next cell.

15 Claims, 1 Drawing Sheet

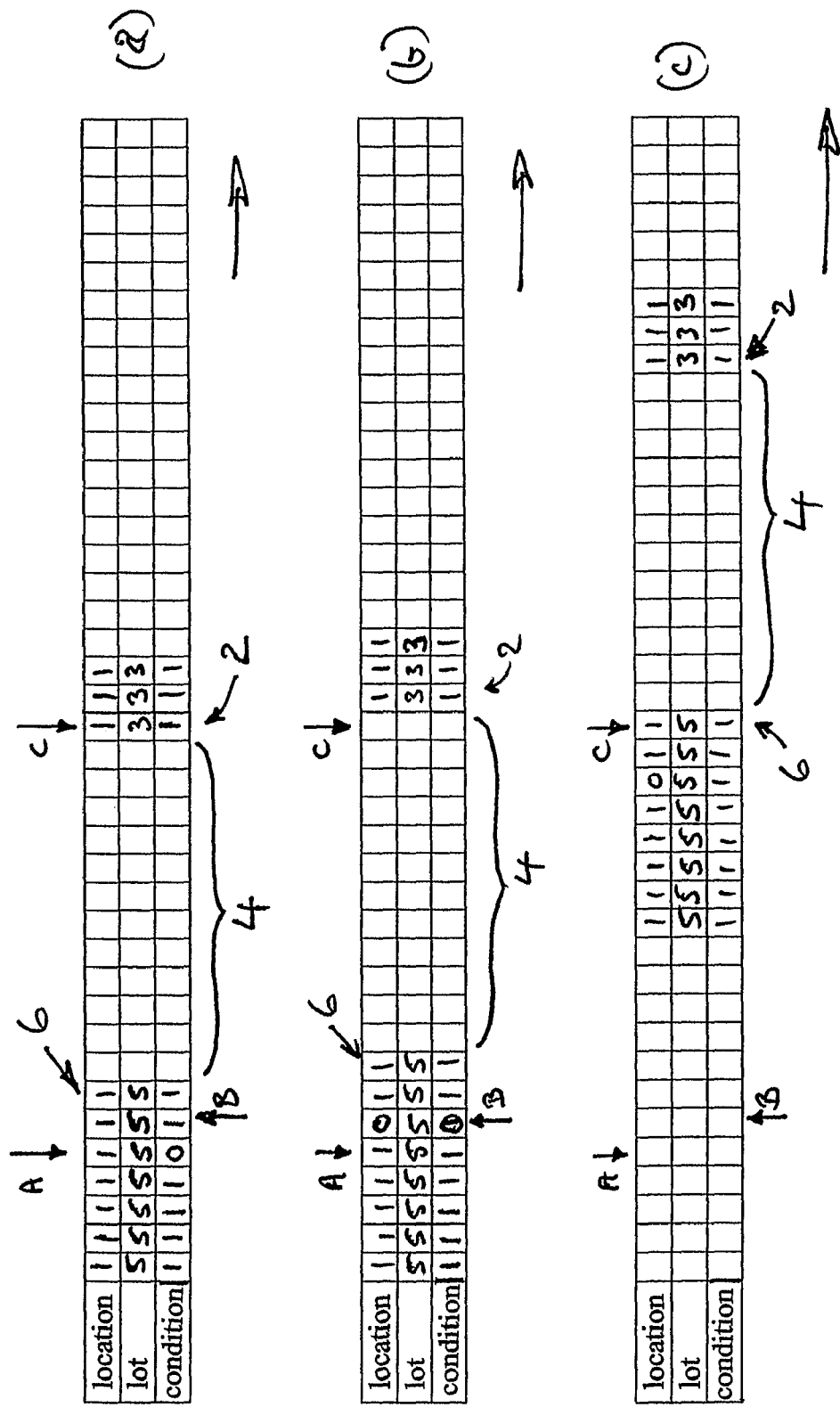
Figure

PRODUCTION LINE CONTROL USING SHIFT REGISTERS FOR CONTACT LENS MANUFACTURE

This invention relates to contact lens manufacturing and in particular to a method for controlling the process through a manufacturing line. The control process allows multiple stock keeping units (SKU) can be simultaneously fabricated on the same manufacturing line.

In known automated contact lens production processes a contact lens is formed by sandwiching a reaction mixture between two mould sections having respective concave and convex optical surfaces which define the lens. The reaction mixture is dispensed into the concave surface which forms the front curve of the lens and the second mould section is seated on the first mould section such that the convex surface which forms the back curve of the lens is placed over the concave surface to define a mould cavity between the concave and convex surfaces. The reaction mixture within the assembled mould is subject to a curing cycle which polymerises the monomer inside the mould cavity. Typical contact lens curing methods include UV radiation and/or thermal curing. Once the curing is complete, the mould sections are separated to reveal the lens which has formed therein.

The lens must pass through a series of further processing stages such as inspection, hydration, primary packaging, labelling, and secondary packaging in which multiple primary packages are housed in a box or carton each having one or more labels to identify its contents.

One type of contact lenses is commonly referred to as "spherical contact lenses", i.e., contact lenses designed to provide a spherical optical correction (or "power") to compensate for myopia (nearsightedness) or hypermetropia (farsightedness). Such contact lenses are also designed with fitting parameters, especially lens diameter and effective base curve. Accordingly, a prescription for a spherical contact lens will typically specify spherical correction (power), lens diameter and base curve. Using hydrogel lenses as an example, manufacturers typically market series of spherical hydrogel contact lenses, each series including lenses having common fitting parameters and offering powers in 0.25 or 0.50 diopter increments.

In addition to spherical lenses, there are contact lenses commonly referred to as "toric contact lenses", i.e. contact lenses having a toric optical zone that are designed to correct refractive abnormalities of the eye associated with astigmatism. The toric optical zone provides cylindrical correction to compensate for the astigmatism, with the cylindrical correction commonly referred to as "cylindrical power". The toric surface may be formed in either the posterior-lens surface (back surface toric lens) or in the anterior lens surface (front surface toric lens). Whereas spherical contact lenses may freely rotate on the eye, toric contact lenses have some type of ballast to inhibit rotation of the lens on the eye is inhibited so that the cylindrical axis of the toric zone remains generally aligned with the axis of the astigmatism. For example, one or more sections of the lens periphery may be thicker (or thinner) than other sections to provide the ballast. Toric contact lenses are manufactured with a selected relationship (or offset) between the cylindrical axis of the toric optical zone and the orientation of the ballast. This relationship is expressed as the number of degrees (or rotational angle) that the cylindrical axis is offset from the orientation axis of the ballast; toric contact lens prescriptions specify this offset, with toric lenses generally being offered in 5 or 10-degree increments ranging from 0° to 180°.

Since astigmatism requiring vision correction is usually associated with other refractive abnormalities, such as nearsightedness or farsightedness, toric contact lenses are generally prescribed, in addition to cylindrical power and axes offset, with a spherical correction and fitting parameters as for the aforementioned spherical contact lenses. Accordingly, a prescription for toric contact lens will typically specify spherical correction (power), lens diameter, base curve, cylindrical correction, and axes offset. It will be appreciated that for each power of lens a manufacturer may offer a series of 36 lenses having different spherical correction. However, there may not be a need for a great number of any given lens configuration.

In the past many contact lens fabrication and packaging lines have been configured to produce one SKU of lenses at a time, each lens having the same predetermined optical characteristic, for example, all the lenses are +1 spherical power. As a result, a limited number of stocking units (SKUs) were produced in large SKU sizes. Changing production to a different SKU has required cleaning out the manufacturing line, and changing the moulds. Changing the moulds that are used in such systems have been attendant with machine downtime.

EP-A-1052084 addresses the need for greater numbers of SKUs in smaller SKUs by fabricating multiple, different SKUs without requiring that the manufacturing line be shut down and cleaned out, and avoids cross-contamination of the different SKUs.

It proposes a method for tracking multiple SKUs of ophthalmic devices in a manufacturing line, comprising the steps of:

assembling first moulding devices at least one of said first moulding devices having an identification means;

reading said identification means of said at least one of said first moulding devices;

forming first moulded parts using said first moulding devices;

providing a plurality of carriers, said carriers having carrier indicators;

transferring said first moulded parts to at least one of said plurality of carriers;

reading said carrier indicator of said at least one of said plurality of carriers carrying said first moulded parts; and storing in machine-accessible memory the information associated with said identification means of said at least one of said first moulding devices and the information associated with said carrier indicator carrying said first moulded parts. An apparatus for implementing the method is also disclosed.

U.S. Pat. No. 5,844,802 discloses a production line tracking and quality control system and method thereof comprises a series of pallets for carrying one or more first contact lens mould halves or one or more complementary second contact lens mould halves throughout a contact lens fabrication facility. Each pallet of the series is transported on a conveyor device throughout the fabrication facility, and each pallet includes a unique identifying code. The fabrication facility includes one or more process stations and a control device provides real time monitoring of contact lens fabrication processes at the one or more process stations. The control device further includes a tracking device for identifying the unique code of each of the pallets at one or more process stations while continually receiving monitored process condition values at each station. For each identified pallet, the control device generates process status information for memory storage in the form of a reject flag, when the process conditions are out of predetermined limits, or, an acceptance flag indicating that process conditions are within predetermined limits. The process status information is updated when the pallets are identified and the status of each pallet is checked when entering or exiting a process station. Tracking of pallet status information may be accomplished using a shift register.

It has now been found that the use of a multiple shift register system provides improved control in a contact lens production line which simultaneous processes a plurality of lots or SKUs.

Therefore according to the invention there is provided a method for controlling a production line for the manufacture and/or packaging of contact lenses which production line simultaneous by processes at least two lots, the method comprising dividing at least a portion of the production line into a series of cells through which the contact lens pass sequentially, and providing a control system comprising at least three shifts registers each containing information about each of said cells, including:

(a) a location shift register which indicates whether a cell should be empty or occupied,
(b) a lot data shift register which is a non-binary shift register and contains manufacturing and/or prescription data about the contact lens which should be in the cell and
(c) a condition shift register which provides an indication of the condition of the product in the cell, and simultaneously indexing all of said shift registers as a lens passes down the production line from one cell to the next cell.

At least a portion and preferably the entire production line are divided into a series of cells through which the product passes. In many cells the product will be subjected to a processing activity or inspection activity. Other cells may be idle in which no activity takes place or comprise a conveyor moving the product from one station to the next. Thus, the cells in the production line may be physical in the sense of a work station or virtual in the sense that a cell may represent a certain position along a conveyor belt etc. The production line may be divided into a series of stages or chains each being divided into a plurality of cells, each having a multiple shift register. For example, there may be a stage for lens moulding, a stage for lens packaging etc.

It has been found that precise control of a contact in a production line can be achieved using a multiple shift register system. The shift registers are independently maintained and indexed simultaneously as a lens passes down the production line from one cell to the next cell. In this way, there is at least three pieces of information associated with each cell at any time during the production process, which information can be used to control the operation of the process conducted in a cell and to provide information which may be compared with the output of a detector to check the integrity of the lens within a cell.

The purpose of the location shift register is to provide an indication of whether a cell should be empty or occupied. During the manufacturing process there may be reasons why a cell should be unoccupied. For example, if a product has not been subject to process conditions which are within acceptable predetermined limits, the product may be ejected from the manufacturing line at an appropriate stage and thereafter the cell which would have otherwise have been occupied by the product will remain empty. One or more empty cells may be deliberately inserted into a manufacturing process as a means of identifying the end of a lot and detection of the lot end may be used to allow a processing station to be reset or trigger some other action e.g. reporting.

The location shift register will be updated from occupied to empty in the event that a product is ejected from the production line. The location shift register is generally a binary shift register.

The lot data shift register is a non-binary shift register containing information about the product being manufactured and may comprise manufacturing and/or prescription data about the contact lens. This information may be accessed at appropriate stages along the production line to control a processing stage within a cell. For example, in the case of a printer printing labels to be applied to the product, the information from the lot data shift register may provide the necessary print information for the label to be printed. The lot data information may also be used to provide the data against which measurements made during the production process may be compared in order to determine whether a product in a cell meets the manufacturing requirements. In some cases the lot data shift register may comprise all of the data about the lot required for the production process. In other cases the lot data shift register may provide a pointer or link to a lot file stored on a computer which provides additional information about the lot.

The condition shift register provides an indication of the condition of a product in a cell, namely, whether the product in the cell complies with the manufacturing requirements. At various stages along the production line the processing conditions will be subject to measurement to determine whether they meet predetermined requirements and the condition register will be adjusted to reflect the status e.g. pass, fail. Similarly, the product itself may be subject to inspection to determine whether it meets the desired criteria and the condition shift register adjusted to reflect its status. The information in the condition shift register may be used to trigger apparatus in a cell further down the production line to remove the product from the production line. If a product is removed from the production line the location shift register will be updated to show the cell to be empty. The lot data shift register for such a cell will still contain the information regarding the manufacturing/prescription and the condition shift register will show the product as being rejected.

The condition data shift register may be a binary shift register providing a simple indication of PASS/FAIL. Alternatively it may be a non-binary shift register e.g. to provide information as to whether product may be recycled. For example in a packaging stage a blister package containing a lens could have a variety of conditions, such as,
1. good lens, labelled blister
2. bad lens, labelled blister
3. good lens unlabelled blister
4. bad lens unlabelled blister Condition (1) is acceptable for further processing, conditions (2) and (4) would be rejected and condition 3 recycled.

The multiple shift register system of the invention provides an effective means of controlling the production line for the manufacture and/or packaging of contact lenses and of checking whether the product meets the manufacturing requirements and ejecting failed products from the production line at appropriate stages. It has the capability to detect whether an operator has manually interfered with the production line e.g. if an operator has inadvertently removed a product or placed a product in an incorrect cell. Furthermore, the multiple shift register may be used to provide a positive indication of the end of one lot and the beginning of the next lot thereby allowing multiple lots or SKU's to be simultaneously processed along the production line.

When the production line is started it is convenient to insert a predetermined number of spaces e.g. thirty-six. Thus, there will be a series of cells in which the location shift register will show empty and there will be no lot data or condition data associated with these cells. As this empty series of cells proceeds along the production line they will be detected by appropriate detectors at various stages along the production process. The detection of the series of empty cells may act as a trigger for a processing station to be reset e.g. by wiping any data from the process equipment, such as, printers and the like, to ensure that there is no possibility of data from the previous lot being used in respect of a subsequent lot. The leading edge of the lot is readily detected since both the location shift register and lot data shift register will show the presence of a product and the data associated therewith to enable a processing station to read the lot data and trigger the appropriate processing for that cell.

Similarly, at the end of a lot or between lots, a predetermined number of empty cells is inserted in the production line so that the end of a lot can be recognised by a detector determining the presence of a band of empty cells where there is no information on the location shift register or lot data shift register. Detection of the lot end may trigger a processing step such as a reporting step and may also cause data to be completely removed from processing equipment.

The use of a band of empty cells or gap between lots may also be used as a fail-safe system to make sure there is no possible contamination between successive lots. Such a gap defence system is an independent monitoring system of the gaps i.e. empty cells, between successive lots. Essentially, it is a further shift register which independently checks that there is no product in a cell where there should be a gap. At various points along the production line there are detectors which detect the absence of product in the cell and count the number of successive empty cells. The information is reported to the gap defence system which ensures that the correct gap is maintained throughout the production line. For example, if there are thirty-six empty cells between successive lots, the gap defence system will check that the gap remains at various stages along the production line. If there has been a fault in the production process or an operator has interfered with the production line resulting in a product being in a cell within the gap, such an infringement will be detected by the gap defence system which can take priority over all other process controls and reject products or lots or signify that products or lots should be subject to additional inspection. Where a production line is divided into a series of stages it may be appropriate to have a different number of gaps between successive lots in different stages.

The gap defence system is essentially a safety check to prevent contamination between lots. In practice, if the other production controls are working properly and an operator does not take action which is beyond the remit of the production controls, the gap defence system will be invisible. However, if a gap is breached by a cell being occupied within the gap, then the gap defence system will reject the product or provide a warning.

The invention will now be described with reference to the accompanying FIGURE which represents a series of diagrams of a multiple shift register system in accordance with the invention.

Diagram (a) illustrates a multiple shift register system comprising a location shift register, a lot data shift register and a condition shift register which are represented as rows of cells. The production line is divided into a series of cells corresponding to those on the shift registers. Only part of a production line is shown.

The diagrams show the trailing end (2) of a first lot, a gap (4) comprising twelve empty cells and a leading end (6) of a subsequent lot. The lots proceed down the production line from left to right as shown in the diagrams.

The location and condition shift registers are binary shift registers and will be filled by "1" or "0" In the case of the location shift register "1" represents the fact the cell contains product and "0" means the cells is empty. In the condition shift register "1" represents an acceptable product and "0" represents an unacceptable product.

The lot data shift register is a non-binary shift register and contains data pertaining to the manufacture and/or prescription of the contact lens. The lot shift register may contain the data necessary for the manufacturing process or may comprise a pointer or link to a computer file containing the data. For convenience, the numeral "3" represents the lot data for the first lot and the numeral "5" represents the data for the second lot.

The arrow marked A represents a sensor in the production line for determining whether the product passes or fails a particular test. The sensor may detect the presence or absence of product, read a bar code and compare with lot data information, inspect a lens e.g. as disclosed in WO 2004/056555, detect the presence of a label or a blister package etc. If the product passes the test the condition shift register will be marked "1" and if the product fails the test the condition shift register will be marked as "0".

The arrow marked B represents a reject mechanism on the production line. In the event the condition shift register is marked "1" the reject mechanism will not operate. In the event the condition shift register is marked "0" the reject mechanism will operate ejecting the product from the production line and therefore the location shift register will be altered from "1" to "0". Diagrams (a) and (b) illustrate this concept with Diagram (a) showing detector A failing a product in the cell and Diagram (b) shows the production line after the shift registers have been indexed by one cell showing the reject mechanism B ejecting the product from the production line. The reject mechanism may comprise a sensor to confirm the product has been ejected. The ejection of the product results in the location register being marked "0".

Arrow C represents a scanner. As shown in Diagram (a) the trailing end (2) of a lot passes the scanner (C). When the shift registers are indexed by one cell as shown in Diagram (b) the scanner (C) will detect no product. As further indexing of the shift registers occurs as the lots pass down the production line, scanner (C) will continue to register empty cells. The scanner (C) may be associated with a counting mechanism such that upon detection of a predetermined number of empty cells, the scanner will automatically delete any data associated with the preceding lot.

When the end of a lot is determined by counting the gaps, the control system may send a signal to the operator to check the information and to visually confirm that the end of a lot has been completed. The operator will then close the lot and the control system will indicate that the lot has successfully matched its exit criteria and will free the lot file of information and pass the information for the lot to the next manufacturing stage.

Diagram (C) shows the position where the leading end of the next lot (marked 5 in the lot data shift register) reaches the scanner (C) i.e. after twelve empty cells. The scanner (C) upon detecting the existence of product will automatically look to the lot data register for information about the lot. The scanner will read data from the lot data shift register, optionally extracting data from a lot file if directed by the lot data shift register, and will compare that information with information read directly from the product in the cell. For example, the scanner may be in the form of a bar code reader which reads a label on the product or a bar code on a carrier of the product. If the data scanned from the product matches the data from the lot data shift register the scanner will pass the product and the condition shift register will be marked "1". If the data from the product does not correspond with the data from the lot data shift register, the scanner will fail the product and the condition shift register will be adjusted to "0". The scanner may retain data downloaded at the start of a lot to save repeatedly downloading the same data each time the shift register is indexed.

The invention claimed is:

1. A method for controlling a production line that can simultaneously manufacture and/or package at least two lots of contact lenses, the method comprising;
    dividing at least a portion of the production line into a series of cells through which the contact lenses pass sequentially,
    providing a control system comprising at least three shift registers each containing information about each of said cells, including:
        (a) a location shift register which indicates whether a cell should be empty or occupied,
        (b) a lot data shift register which is a non-binary shift register and contains manufacturing and/or prescription data about the contact lens which should be in the cell and
        (c) a condition shift register which provides an indication of the condition of the lens in the cell, and
    simultaneously indexing all of said shift registers as a lens passes down the production line from one cell to the next cell.

2. A method as claimed in claim 1 further comprising detecting the presence or absence of product in a cell and comparing the result with the information for that cell in the location shift register.

3. A method as claimed in claim 2 further comprising inserting a plurality of adjacent empty cells at the start and end of a manufacturing lot.

4. A method as claimed in claim 3 wherein the detecting of said plurality of empty cells is used to trigger a processing event.

5. A method as claimed in claim 4 wherein the processing event is selected from resetting a processing station, wiping data from a processing station and instigating a reporting action.

6. A method as claimed in claim 1 further comprising inserting a gap comprising a predetermined number of empty cells positioned between-successive manufacturing lots on the production line and the control system further comprises a gap defence mechanism including detectors and counters to monitor said gap as it proceeds down the production line.

7. A method as claimed in claim 1 wherein the manufacturing and/or prescription data from the lot data shift register is used to control the activity of a cell.

8. A method as claimed in claim 1 further comprising the step of inspecting the product in a cell and/or monitoring the production activity in a cell and comparing the resulting data with data in the lot data shift register.

9. A method as claimed in claim 1 wherein information regarding the condition of the product in the condition shift register is used to trigger ejection of a product from the production line.

10. A method as claimed in claim 9 wherein the ejection of product from the production line causes the location shift register to change to signify the cell is empty of product.

11. A method as claimed in claim 4 further comprising inserting a gap comprising a predetermined number of empty cells positioned between-successive manufacturing lots on the production line and the control system further comprises a gap defence mechanism including detectors and counters to monitor said gap as it proceeds down the production line.

12. A method as claimed in claim 4 further comprising inspecting the product in a cell and/or monitoring the production activity in a cell and comparing the resulting data with data in the lot data shift register.

13. A production line for the simultaneous manufacture and/or packaging of at least two lots of contact lenses, the production line comprising:
    a series of cells through which the contact lenses pass sequentially;
    a control system comprising at least three shift registers each of which contain information about each of the cells, including:
        (a) a location shift register which indicates whether a cell should be empty or occupied,
        (b) a lot data shift register which is a non-binary shift register and contains manufacturing and/or prescription data about the contact lens which should be in the cell, and
        (c) a condition shift register which provides an indication of the condition of the lens in the cell, and
    a means for simultaneously indexing all of said shift registers as a lens passes down the production line from one cell to the next cell.

14. A production line as claimed in claim 13 further comprising a means for detecting the presence or absence of product in a cell and comparing the result with the information for that cell in the location shift register.

15. A production line as claimed in claim 13 further comprising a means for ejecting a product from the production line based upon information on the condition of the product in the condition shift register.

* * * * *